United States Patent
Lee et al.

(10) Patent No.: US 11,663,331 B2
(45) Date of Patent: May 30, 2023

(54) CREATING A MALWARE DOMAIN SINKHOLE BY DOMAIN CLUSTERING

(71) Applicant: International Business Machines Corporation, Armonk, NY (US)

(72) Inventors: Cheng-Ta Lee, Taipei (TW); Bo-Yu Kuo, Kaohsiung (TW); Gideon Zenz, Kassel (DE); Andrii Iesiev, Northampton, MA (US); Jacobus P. Lodewijkx, Oakton, VA (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 16/785,834

(22) Filed: Feb. 10, 2020

(65) Prior Publication Data

US 2021/0248235 A1 Aug. 12, 2021

(51) Int. Cl.
| | |
|---|---|
| *H04L 29/06* | (2006.01) |
| *G06F 21/56* | (2013.01) |
| *G06F 18/23* | (2023.01) |
| *G06N 3/048* | (2023.01) |

(52) U.S. Cl.
CPC ............ *G06F 21/561* (2013.01); *G06F 18/23* (2023.01); *G06F 21/566* (2013.01); *G06N 3/048* (2023.01)

(58) Field of Classification Search
CPC .... G06K 9/6218; G06N 3/0481; G06N 3/063; G06N 3/084
See application file for complete search history.

(56) References Cited

U.S. PATENT DOCUMENTS

| | | | |
|---|---|---|---|
| 9,405,903 B1 | 8/2016 | Xie | |
| 9,497,213 B2 | 11/2016 | Thompson | |
| 9,560,072 B1 * | 1/2017 | Xu | ............... H04L 41/12 |
| 9,917,852 B1 | 3/2018 | Wei | |

OTHER PUBLICATIONS

"Solving the Malware Domain Generation Algorithm Problem", Henson Security Tools, Posted on Mar. 26, 2016, 2 pages, <https://hensonsecuritytools.wordpress.com/2016/03/26/solving-the-malware-domain-generation-algorithm-problem/>.
Antonakakis, et al., "Detecting and Tracking the Rise of DGA-Based Malware", The Unisex Magazine, vol. 37, No. 6, Dec. 2012, pp. 15-24, <https://www.usenix.org/system/files/login/articles/login1212_antonakakis.pdf>.

(Continued)

*Primary Examiner* — Jeffrey C Pwu
*Assistant Examiner* — Thong P Truong
(74) *Attorney, Agent, or Firm* — Edward P. Li

(57) ABSTRACT

A computer-implemented method, a computer program product, and a computer system for creating malware domain sinkholes by domain clustering. The computer system clusters malware domains into domain clusters. The computer system collects domain metrics in the domain clusters. The computer system sorts clustered malware domains in the respective ones of the domain clusters, based on the domain metrics. The computer system selects, from the clustered malware domains in the respective ones of the domain clusters, a predetermined number of top domains as candidates of respective domain sinkholes, wherein the respective domain sinkholes are created for the respective ones of the domain clusters.

15 Claims, 7 Drawing Sheets

(56) References Cited

OTHER PUBLICATIONS

Chin, et al., "A Machine Learning Framework for Studying Domain Generation Algorithm (DGA)-Based Malware", 14th International Conference, SecureComm 2018, pp. 433-448, <https://www.researchgate.net/publication/329973872>.

Li, et al., "A Machine Learning Framework for Domain Generation Algorithm-Based Malware Detection", IEEE Access vol. 7, Jan. 31, 2019, pp. 32765-32782, <https://ieeexplore.ieee.org/stamp/stamp.jsp?arnumber=8631171>.

Mell et al., "The NIST Definition of Cloud Computing", National Institute of Standards and Technology, Special Publication 800-145, Sep. 2011, 7 pages.

* cited by examiner

CREATING A MALWARE DOMAIN SINKHOLE BY DOMAIN CLUSTERING

BACKGROUND

The present invention relates generally to a malware domain sinkhole, and more particularly to creating a malware domain sinkhole by domain clustering.

Registering domain generation algorithm (DGA) domains which are not yet registered by threat actors can help create a malware domain sinkhole to collect more information about malware, malware families, campaigns, and even threat actors. For example, which ports does a malware use to connect to a command-and-control server can be known. Which protocol that a malware use and whether there are special patterns in malware activities can also be known. With these pieces of information, security analysts can create a more accurate detection method and a comprehensive security policy to block malware. Victim information can also be collected so that users or system administrators can be actively notified of potential malware infections.

It turns out that registering DGA domain is not a new idea. However, there is a common problem in all existing technologies: poor scalability. If all the DGA domains in a sinkhole resolve to a same IP address, which domain that a victim is connecting to cannot be known, unless the malware uses HTTP as a protocol. It is also not possible to assign a unique IP to every domain in the sinkhole, because IPv4 addresses are expensive while IPv6 addresses are slowly getting popular. Even with IPv6 addresses, there is operational cost for managing each IP address and having too many IP addresses in a sinkhole always make maintenance complicated. The consequence of this limitation is that all existing technologies need to carefully select the domains to be registered.

SUMMARY

In one aspect, a computer-implemented method for creating malware domain sinkholes by domain clustering is provided. The computer-implemented method includes a computer system clustering malware domains into domain clusters. The computer-implemented method further includes the computer system collecting domain metrics in the domain clusters. The computer-implemented method further includes the computer system sorting clustered malware domains in respective ones of the domain clusters, based on the domain metrics. The computer-implemented method further includes the computer system selecting, from the clustered malware domains in the respective ones of the domain clusters, a predetermined number of top domains as candidates of respective domain sinkholes, wherein the respective domain sinkholes are created for the respective ones of the domain clusters.

In another aspect, a computer program product for creating malware domain sinkholes by domain clustering is provided. The computer program product comprises a computer readable storage medium having program instructions embodied therewith, and the program instructions are executable by one or more processors. The program instructions are executable to: cluster, by a computer system, malware domains into domain clusters; collect, by the computer system, domain metrics in the domain clusters; sort, by the computer system, clustered malware domains in respective ones of the domain clusters, based on the domain metrics; select, by the computer system, from the clustered malware domains in the respective ones of the domain clusters, a predetermined number of top domains as candidates of respective domain sinkholes, wherein the respective domain sinkholes are created for the respective ones of the domain clusters.

In yet another aspect, a computer system for creating malware domain sinkholes by domain clustering is provided. The computer system comprises one or more processors, one or more computer readable tangible storage devices, and program instructions stored on at least one of the one or more computer readable tangible storage devices for execution by at least one of the one or more processors. The program instructions are executable to cluster, by a computer system, malware domains into domain clusters. The program instructions are further executable to collect, by the computer system, domain metrics in the domain clusters. The program instructions are further executable to sort, by the computer system, clustered malware domains in respective ones of the domain clusters, based on the domain metrics. The program instructions are further executable to select, by the computer system, from the clustered malware domains in the respective ones of the domain clusters, a predetermined number of top domains as candidates of respective domain sinkholes; wherein the respective domain sinkholes being created for the respective ones of the domain clusters.

DETAILED DESCRIPTION

Embodiments of the present invention disclose a system and method for creating malware domain sinkholes by domain clustering. A DGA clustering model (or DGA classifier) in the system can recognize malware families behind DGA domains (or malware domains) with high accuracy. A volumetric clustering model in the system can group DGA domains together with similar activity, and the DGA domains in a cluster are highly related.

In the embodiments of the present invention, once the system for creating malware domain sinkholes by domain clustering creates domain groups or clusters, the system assigns only one IP address to a respective one of the domain groups or clusters. With the only one IP address to the respective one of groups or clusters, the system and method still retain good visibility when monitoring the DGA domains. The mechanism of creating a malware domain sinkhole for a domain cluster by domain clustering reduces the complexity in operation.

The embodiments of the present invention discloses an approach that ensures resiliency in the system by re-grouping or re-clustering. When a new DGA domain is added to the malware domain sinkholes, there are two options to handle it. First, the system and method classify the given DGA domain so that the DGA domain is put to an existing cluster or group. Second, the given DGA domain may trigger re-grouping or re-clustering among all the DGA domains in the malware domain sinkholes, in order to achieve better efficiency.

The embodiments of the present invention discloses an approach that leverages the malware domain sinkholes themselves to establish a feedback channel to improve clustering or grouping of DGA domains. For example, existing sinkhole or honeypot technologies can tell the system how many ports are being connected to a domain group, and this information is important feedback to tell the system whether the system has correctly clustered or grouped the DGA domains.

In summary, the embodiments disclose three aspects of the present invention: (1) clustering DGA domains into groups or clusters and then creating DGA domain sinkholes or honeypots for respective ones of the domain groups or the clusters, (2) re-clustering DGA domains based on new DGA domains, and (3) re-clustering DGA domains based on feedback from the DGA domain sinkholes or honeypots.

Figure 1:
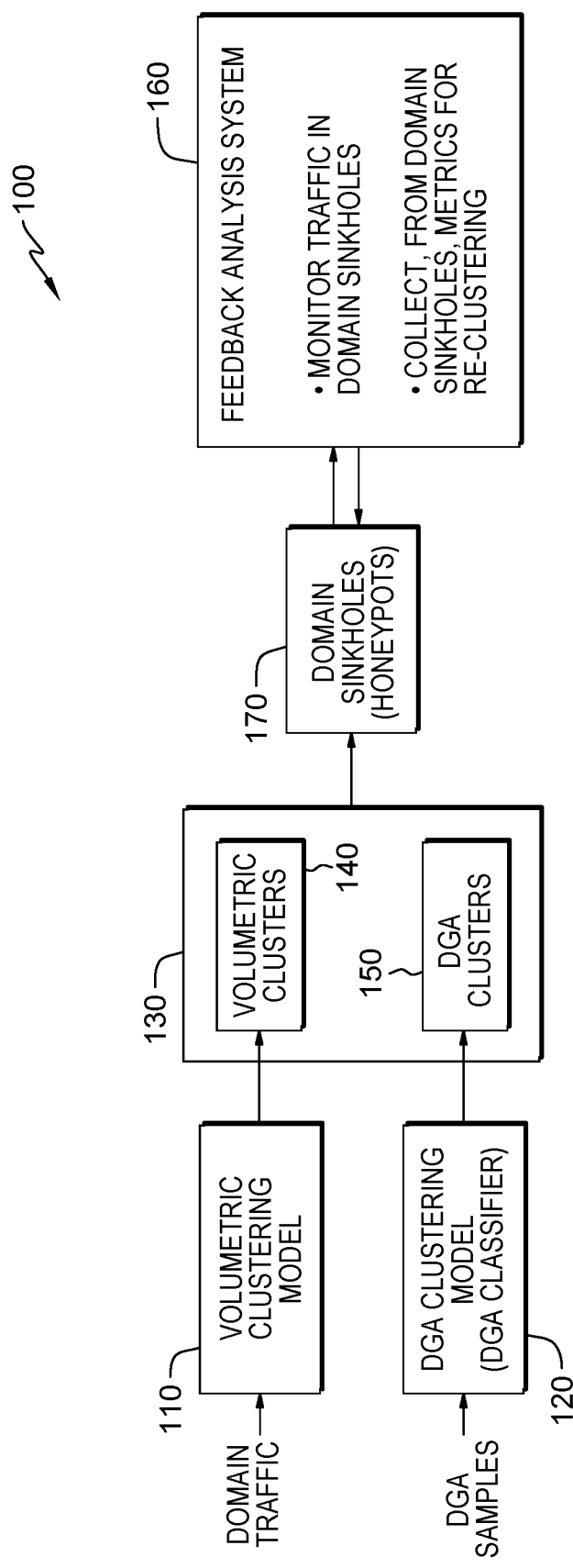
FIG. 1 is a systematic diagram showing a system for creating malware domain sinkholes by domain clustering, in accordance with one embodiment of the present invention.

FIG. 1 is a systematic diagram showing system 100 for creating malware domain sinkholes by domain clustering, in accordance with one embodiment of the present invention. The system 100 includes two machine learning models: a volumetric clustering model 110 and a DGA clustering model (or DGA classifier) 120. The volumetric clustering model 110 groups or clusters malware domains into volumetric clusters 140, based on activities of the malware domains. The DGA clustering model 120 groups or clusters malware domains together based on malware domain families, and the DGA clustering model 120 groups or clusters malware domains into DGA clusters 150.

The volumetric clustering model 110 is a clustering model that trained with query traffic of domains. The volumetric clustering model 110 groups domains that are more difficult for the DGA clustering model 120 to group. To collect input data for volumetric clustering, the volumetric clustering model 110 performs aggregation from the Domain Name System (DNS) traffic, based on a time window (e.g., aggregate on a time interval of 1 hour), and also performs normalization to scale the traffic of domains between 0 and 1. Then, the volumetric clustering model 110 uses an algorithm such as k-means or DBSCAN (density-based spatial clustering of applications with noise) to perform volumetric clustering and group domains that have similar activity.

The DGA clustering model (or DGA classifier) 120 is a convolutional neural network model that is trained with a large amount of DGA samples from multiple malware families. The convolutional neural network works well and efficient on text classification; it can learn common patterns of DGA domains (or malware domains) from each malware, such combination of characters, lengths of the domains, and the number of digits in the domains. In order to have training datasets, the DGA clustering model (or DGA classifier) 120 collects DGA domains of each malware and also benign domains. The DGA domains can be obtained from reverse engineering malware code, and the benign domains can be collected from whitelist. The training of the convolutional neural network can be easily implemented with deep learning libraries and frameworks, such as TensorFlow (an end-to-end open source platform for machine learning), Keras (an open-source neural-network library written in Python), and Torch (an open-source machine learning library, a scientific computing framework, and a script language). With iterations of the training, the DGA clustering model (or DGA classifier) 120 can be used to group domains based on malware domain families.

The system 100 selects a predetermined number of domains in respective ones of domain clusters 130 (including the volumetric clusters 140 and the DGA clusters 150) and creates sinkholes or honeypots for the respective ones of domain clusters 130. Therefore, the system 100 creates domain sinkholes (or honeypots) 170.

Furthermore, the system 100 re-clusters or re-groups the domains based on new domains. When more and more new domains are fed into the system 100 as time goes by, the DGA clustering model (or DGA classifier) 120 may not be as efficient as it has been at the beginning. For example, malware authors may have changed their algorithms or feed for generating DGA domains, and there may be new malware with new DGA algorithms that are totally different from DGA algorithms for other malware. Therefore, updating the DGA clustering model (or DGA classifier) 120 and re-clustering (or re-grouping) help the system 100 group malware domains with the latest status of the DGA domains.

The system 100 further includes a feedback analysis system 160. Lifetimes of DGA domains are usually short, so that the selected domains in domain sinkholes (or honeypots) 170 may become non-active as time goes by. Therefore, it is necessary to re-cluster the DGA domains based on the feedback from the domain sinkholes (or honeypots) 170. The feedback analysis system 160 monitors traffic in the domain sinkholes (or honeypots) 170 and collects from the domain sinkholes (or honeypots) 170 metrics for determining whether re-clustering (or re-grouping) should be performed by the system 100.

The system 100 is implemented on one or more computer devices or servers. A computer device or severer is described in more detail in later paragraphs with reference to FIG. 5. In another embodiment, the system 100 may be implemented on a virtual machine or another virtualization implementation being run on a computer device. In yet another embodiment, the system 100 may be implemented in a cloud computing environment. The cloud computing environment is described in later paragraphs with reference to FIG. 6 and FIG. 7.

Figure 2:
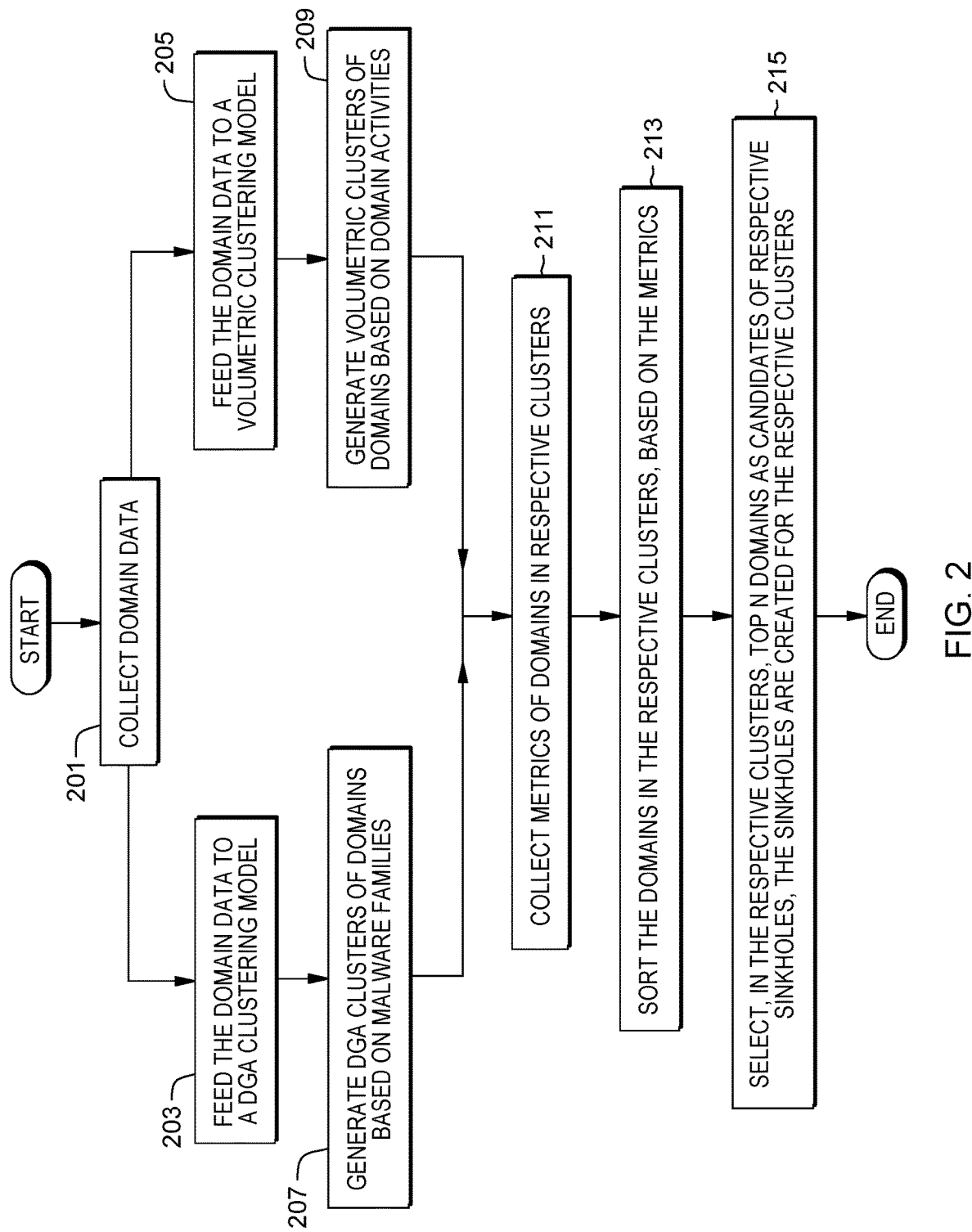
FIG. 2 is a flowchart showing operational steps of clustering malware domains into domain clusters and creating malware domain sinkholes or honeypots for respective ones of domain clusters, in accordance with one embodiment of the present invention.

FIG. 2 is a flowchart showing operational steps of clustering malware domains into domain clusters and creating malware domain sinkholes or honeypots for respective ones of domain clusters, in accordance with one embodiment of the present invention. The steps shown in FIG. 2 is implemented by the system 100 shown in FIG. 1. At step 201, the system 100 collects malware domain data. At step 203, the system 100 feeds the malware domain data (collected at step 201) to the DGA clustering model (or DGA classifier) 120. At step 205, the system 100 feeds the malware domain data (collected at step 201) to the volumetric clustering model 110.

At step 207 (following step 203), the system 100, more particularly the DGA clustering model (or DGA classifier)

120, generates the DGA clusters 150, based on malware domain families. At step 209 (following step 205), the system 100, more particularly the volumetric clustering model 110, generates the volumetric clusters 140, based on domain activities. After domain grouping at step 207 and step 209, the system 100 needs to select domains in respective ones of the domain clusters 130 to create domain sinkholes or honeypots 170 for respective ones of domain clusters 130.

After step 207 and step 209, at step 211, the system 100 collects domain metrics in respective ones of the domain clusters 130 (including the volumetric clusters 140 and the DGA clusters 150). The domain metrics include volumes, geographical locations, query frequencies, and life cycles of the domains, and they may be collected from DNS (Domain Name System) volumetric data. These domain metrics are used at next steps to consider domain candidates of respective ones of the domain sinkholes (or honeypots) 170.

At step 213, the system 100 sorts clustered domains (clustered at step 207 and step 209) in respective ones of the domain clusters 130, based on the domain metrics collected at step 211. At step 215, from the clustered domains in the respective ones of the clusters, the system 100 selects top N domains as candidates of the respective ones of the domain sinkholes (or honeypots) 170. The respective ones of the domain sinkholes (or honeypots) 170 are created for the respective ones of the domain clusters 130. The top N domains in the respective ones of the domain clusters 130 are with largest volumes, largest numbers of geographical locations, most frequent queries, and longest life cycles of the domains. The top N domains are more influential than others and are the best candidates to create the sinkholes or honeypots 170 for the respective ones of domain clusters 130. A great advantage of collecting the lifecycles of the domains is that the metrics provide a hint about how long the system 100 should register the domains.

Figure 3:
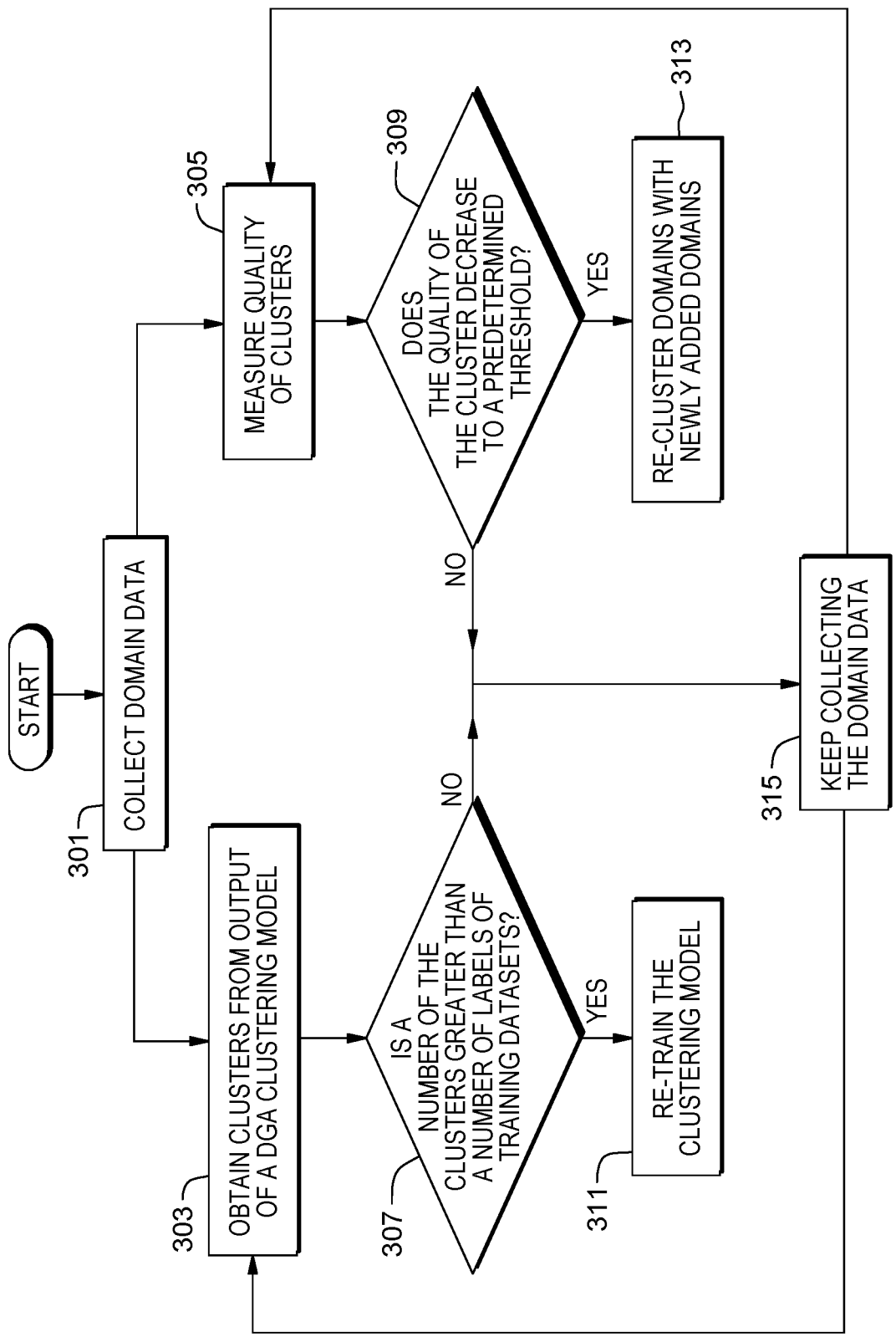
FIG. 3 is a flowchart showing operational steps of re-clustering malware domains based on new malware domains, in accordance with one embodiment of the present invention.

FIG. 3 is a flowchart showing operational steps of re-clustering malware domains based on new malware domains, in accordance with one embodiment of the present invention. The steps shown in FIG. 3 is implemented by the system 100 shown in FIG. 1. At step 301, the system 100 collects malware domain data.

At step 303, the system 100 obtains clusters from output of the DGA clustering model (or DGA classifier) 120. The convolutional neural network in the DGA clustering model (or DGA classifier) 120 can extract important features of the malware domains, and then the system 100 uses these features to perform clustering of the malware domains. To get the extracted features, the last layer of the convolutional neural network is removed and the system 100 takes output of the convolutional neural network to perform clustering of the DGA domains (or malware domains). An unsupervised method is employed and the convolutional neural network is able to group the DGA domains with similar features and groups the DGA domains into malware domain families.

After step 303, the system 100 compares the number of the domain families (obtained at step 303) and the number of labels in training datasets for the DGA clustering model (or DGA classifier) 120. The labels represent malware families in the training datasets. The number of the labels indicates the number of the malware families in the training datasets. If the number of the clusters is larger than the number of the malware families in the training datasets, it is indicated that one or more new malware families may emerge.

At step 307, the system 100 determines whether the number of the clusters is greater than the number of the labels. In response to determining that the number of the clusters is greater than the number of the labels (YES branch of decision step 307), the system 100 re-trains the DGA clustering model (or DGA classifier) 120. In response to determining that the number of the clusters is not greater than the number of the labels (NO branch of decision step 307), the system 100 at step 315 keeps collecting the DGA domain data and then reiterates step 303.

Besides DGA clustering at step 303, the system 100, at step 305, measures quality of the domain clusters, using some techniques such as such as SSE (sum of the squared error), inter cluster distance, and intra cluster distance from the items of respective ones of the domain clusters 130.

After step 305, the system 100 at step 309 determines whether the quality of the domain clusters decreases to a predetermined threshold. In response to determining that the quality decreases to the predetermined threshold (YES branch of decision step 309), the system 100 re-clusters the DGA domains with newly added DGA domains. In response to determining that the quality of the clusters does not decrease to the predetermined threshold (NO branch of decision step 309), the system 100 at step 315 keeps collecting the DGA domain data and then reiterates step 305.

Figure 4:
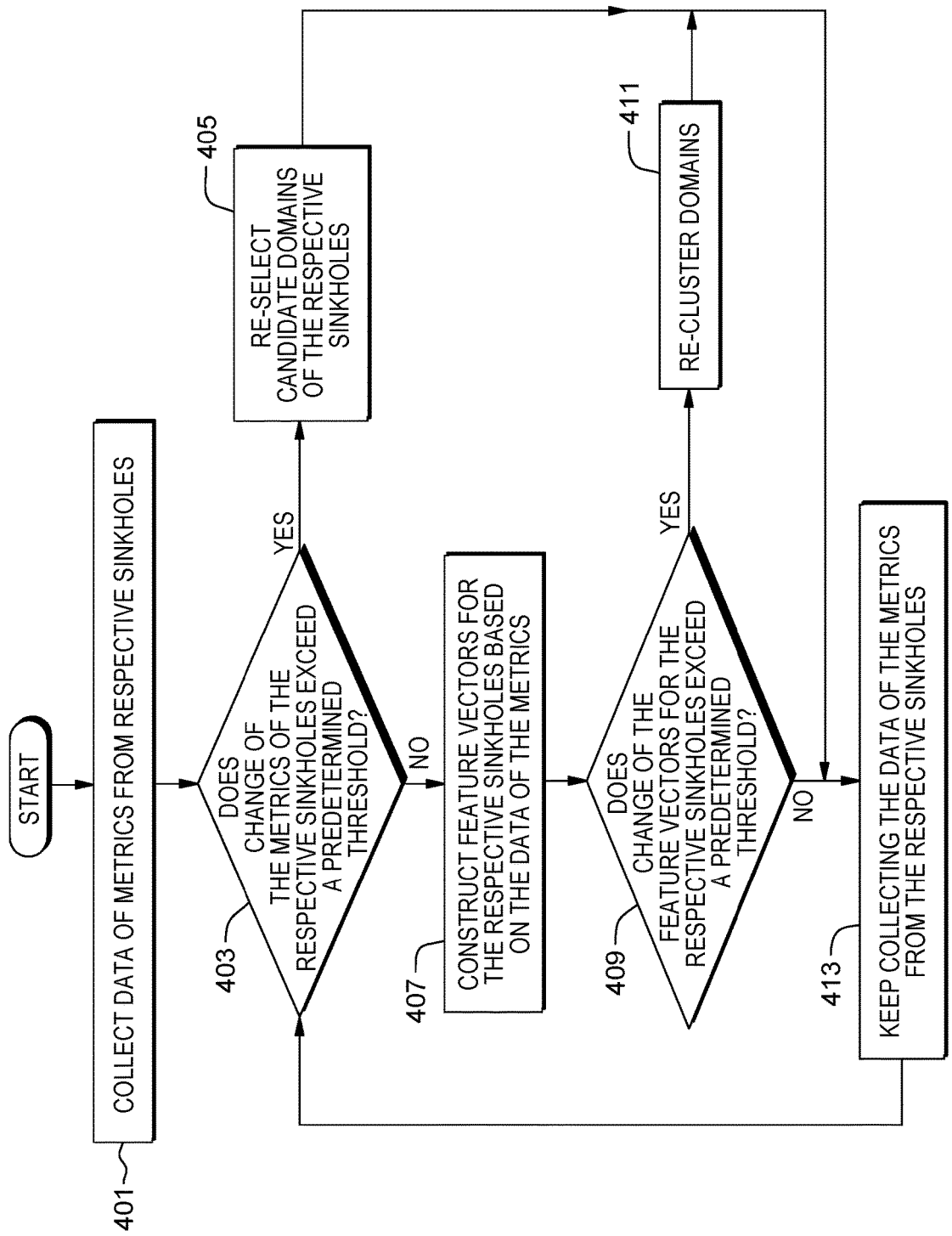
FIG. 4 is a flowchart showing operational steps of re-clustering domains based on feedback from malware domain sinkholes or honeypots created for respective ones of domain clusters, in accordance with one embodiment of the present invention.

FIG. 4 is a flowchart showing operational steps of re-clustering domains based on feedback from malware domain sinkholes or honeypots created for respective ones of domain clusters, in accordance with one embodiment of the present invention. The steps shown in FIG. 4 is implemented by the feedback analysis system 160 in the system 100 shown in FIG. 1.

At step 401, the feedback analysis system 160 collects data of metrics from respective ones of the domain sinkholes (or honeypots) 170. The feedback analysis system 160 collects two metrics for analysis, which are infected source based and attack time based. For infected source based metrics, the feedback analysis system 160 collects data such as IP addresses and port numbers. For attack time based metrics, the feedback analysis system 160 collects data such as frequencies of attacks, received data per time window, and inter arrival time. By monitoring the traffic and status in the domain sinkholes (or honeypots) 170, the feedback analysis system 160 decides when the system 100 needs to re-select the domain for the respective ones of the domain sinkholes (or honeypots) 170.

At step 403, the feedback analysis system 160 determines whether change of the metrics of the respective ones of the domain sinkholes (or honeypots) 170 exceeds a predetermined threshold. In response to determining that the change exceeds the predetermined threshold (YES branch of decision step 403), the feedback analysis system 160 triggers re-selecting candidate domains. Thus, at step 405, the system 100 re-selects the candidate domains for the respective ones of the domain sinkholes (or honeypots) 170. For example, if the traffic drops over 50% for more than 3 days, the feedback analysis system 160 triggers re-selecting the candidate domains using the same method mentioned in precious paragraphs with reference to FIG. 2.

In response to determining that the change does not exceed the predetermined threshold (NO branch of decision step 403), the feedback analysis system 160 constructs feature vectors for the respective ones of the domain sinkholes (or honeypots) 170, based on the data of the metrics collected at step 401. The metrics help the system 100 verify and improve results of the DGA clustering model (or DGA classifier) 120 and the volumetric clustering model 110. The collected data of the metrics is represented as the feature vectors for the respective ones of the domain sinkholes (or honeypots) 170.

At step 409, the feedback analysis system 160 determines whether change of the feature vectors for the respective ones of the domain sinkholes (or honeypots) 170 exceeds a predetermined threshold. The system 100 verifies clustering by looking at the similarities and patterns within the respective ones of the domain sinkholes (or honeypots) 170, using distance measures such as the Euclidean distance or the cosine similarity.

In response to determining that the change of the feature vectors exceeds the predetermined threshold (YES branch of decision step 409), the feedback analysis system 160 triggers re-clustering domains. Thus, the system 100 re-clusters at step 411, using the same method mentioned in precious paragraphs with reference to FIG. 2. For example, if some clusters have a similar pattern, the system 100 merges them into one cluster; if the distance within a cluster is larger than a predetermined threshold, the system 100 re-cluster the domains in the cluster.

In response to determining that the change of the feature vectors does not exceed the predetermined threshold (NO branch of decision step 409), at step 413, the feedback analysis system 160 keeps collecting the data of the metrics from the respective ones of the domain sinkholes (or honeypots) 170. Then, the system 100 reiterates step 403.

Figure 5:
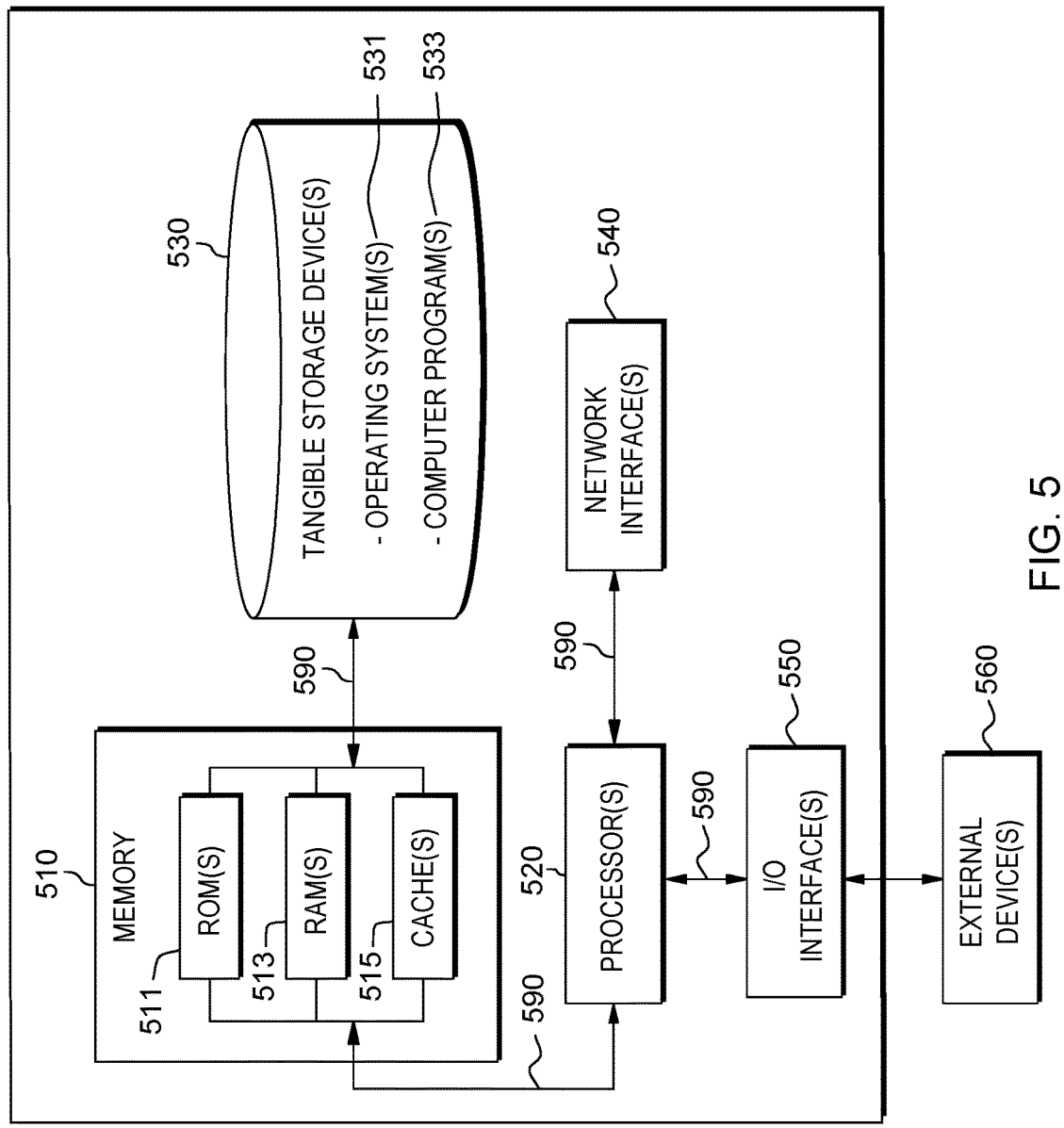
FIG. 5 is a diagram illustrating components of a computer device, in accordance with one embodiment of the present invention.

FIG. 5 is a diagram illustrating components of computer device 500, in accordance with one embodiment of the present invention. It should be appreciated that FIG. 5 provides only an illustration of one implementation and does not imply any limitations with regard to the environment in which different embodiments may be implemented.

Referring to FIG. 5, computer device 500 includes processor(s) 520, memory 510, and tangible storage device(s) 530. In FIG. 5, communications among the above-mentioned components of computer device 500 are denoted by numeral 590. Memory 510 includes ROM(s) (Read Only Memory) 511, RAM(s) (Random Access Memory) 513, and cache(s) 515. One or more operating systems 531 and one or more computer programs 533 reside on one or more computer readable tangible storage device(s) 530.

Computer device 500 further includes I/O interface(s) 550. I/O interface(s) 550 allows for input and output of data with external device(s) 560 that may be connected to computer device 500. Computer device 500 further includes network interface(s) 540 for communications between computer device 500 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
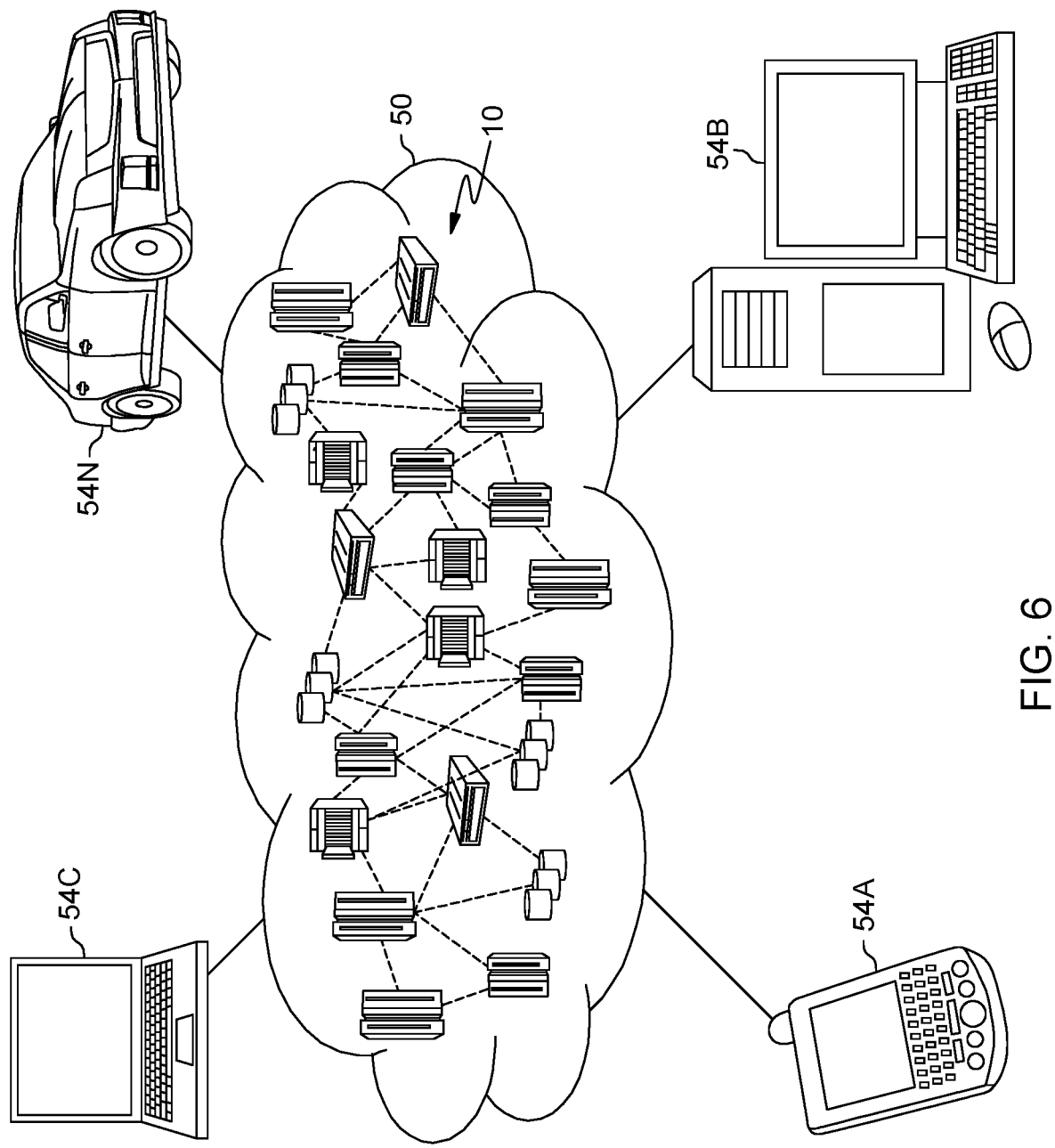
FIG. 6 depicts a cloud computing environment, in accordance with one embodiment of the present invention.

Referring now to FIG. 6, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 7:
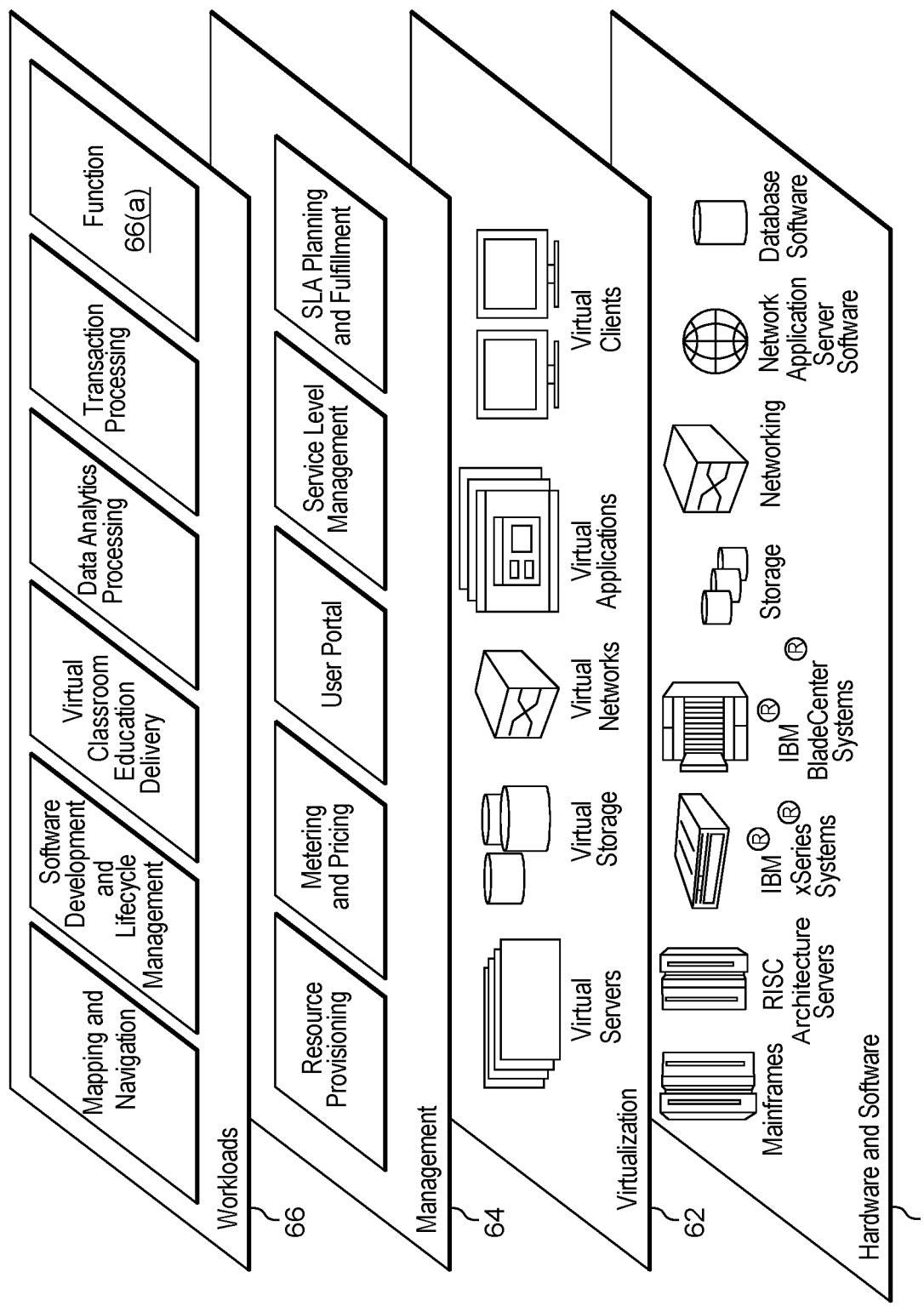
FIG. 7 depicts abstraction model layers in a cloud computing environment, in accordance with one embodiment of the present invention.

Referring now to FIG. 7, a set of functional abstraction layers provided by cloud computing environment 50 (shown FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes, RISC (Reduced Instruction Set Computer) architecture based servers, servers, blade servers, storage devices, and networks and networking components. In some embodiments, software components include network application server software and database software.

Virtualization layer 62 provides an abstraction layer from which the following examples of virtual entities may be provided: virtual servers, virtual storage, virtual networks, including virtual private networks, virtual applications and operating systems, and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User Portal provides access to the cloud computing environment for consumers and system administrators. Service Level Management provides cloud computing resource allocation and management such that required service levels are met. Service Level Agreement (SLA) Planning and Fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: Mapping and Navigation, Software Development and Lifecycle Management, Virtual Classroom Education Delivery, Data Analytics Processing, Transaction Processing, and functionality according to the present invention (Function 66a). In embodiments of the present invention, function 66a is for creating a malware domain sinkhole by domain clustering.

What is claimed is:

1. A computer-implemented method for creating malware domain sinkholes by domain clustering, the method comprising:
   generating, by a computer system, domain clusters based on malware domain families, using a convolutional neural network model;
   obtaining, by the computer system, from output of the convolutional neural network model, the malware domain families;
   determining, by the computer system, whether a number of the malware domains families is greater than a number of malware domain labels in training datasets;
   re-training, by the computer system, the convolutional neural network model, in response to determining that the number of the malware domains families is greater than the number of malware domain labels in training datasets;
   clustering, by the computer system, malware domains into the domain clusters;
   collecting, by the computer system, domain metrics in the domain clusters;
   sorting, by the computer system, clustered malware domains in respective ones of the domain clusters, based on the domain metrics; and
   selecting, by the computer system, from the clustered malware domains in the respective ones of the domain clusters, a predetermined number of top domains as candidates of respective domain sinkholes, the respective domain sinkholes being created for the respective ones of the domain clusters.

2. The computer-implemented method of claim 1, further comprising:
   generating, by the computer system, the domain clusters based on domain activities.

3. The computer-implemented method of claim 2, further comprising:
   measuring, by the computer system, quality of the domain clusters;
   determining, by the computer system, whether the quality of the domain clusters decreases to a predetermined threshold; and
   re-clustering, by the computer system, the malware domains with newly added malware domains, in response to determining that the quality of the domain clusters decreases to the predetermined threshold.

4. The computer-implemented method of claim 1, further comprising:
   collecting, by the computer system, metrics of the respective domain sinkholes;
   determining, by the computer system, whether change of the metrics of the respective domain sinkholes exceeds a first predetermined threshold; and
   re-selecting, by the computer system, the candidates of the respective domain sinkhole, in response to determining that the change of the metrics of the respective domain sinkholes exceeds the first predetermined threshold.

5. The computer-implemented method of claim 4, further comprising:
constructing, by the computer system, feature vectors for the respective domain sinkholes, based on the metrics of the respective domain sinkholes, in response to determining that the change of the metrics of the respective domain sinkholes does not exceed the first predetermined threshold;
determining, by the computer system, whether change of the feature vectors exceeds a second predetermined threshold; and
re-clustering, by the computer system, the malware domains, in response to determining that the change of the feature vectors exceeds the second predetermined threshold.

6. A computer program product for creating malware domain sinkholes by domain clustering, the computer program product comprising a computer readable storage medium having program instructions embodied therewith, the program instructions executable by one or more processors, the program instructions executable to:
generate, by a computer system, domain clusters based on malware domain families, using a convolutional neural network model;
obtain, by the computer system, from output of the convolutional neural network model, the malware domain families;
determine, by the computer system, whether a number of the malware domains families is greater than a number of malware domain labels in training datasets;
re-train, by the computer system, the convolutional neural network model, in response to determining that the number of the malware domains families is greater than the number of malware domain labels in training datasets;
cluster, by the computer system, malware domains into the domain clusters;
collect, by the computer system, domain metrics in the domain clusters;
sort, by the computer system, clustered malware domains in respective ones of the domain clusters, based on the domain metrics; and
select, by the computer system, from the clustered malware domains in the respective ones of the domain clusters, a predetermined number of top domains as candidates of respective domain sinkholes, the respective domain sinkholes being created for the respective ones of the domain clusters.

7. The computer program product of claim 6, further comprising the program instructions executable to:
generating, by the computer system, the domain clusters based on domain activities.

8. The computer program product of claim 7, further comprising the program instructions executable to:
measure, by the computer system, quality of the domain clusters;
determine, by the computer system, whether the quality of the domain clusters decreases to a predetermined threshold; and
re-cluster, by the computer system, the malware domains with newly added malware domains, in response to determining that the quality of the domain clusters decreases to the predetermined threshold.

9. The computer program product of claim 6, further comprising the program instructions executable to:
collect, by the computer system, metrics of the respective domain sinkholes;
determine, by the computer system, whether change of the metrics of the respective domain sinkholes exceeds a first predetermined threshold; and
re-select, by the computer system, the candidates of the respective domain sinkhole, in response to determining that the change of the metrics of the respective domain sinkholes exceeds the first predetermined threshold.

10. The computer program product of claim 9, further comprising the program instructions executable to:
construct, by the computer system, feature vectors for the respective domain sinkholes, based on the metrics of the respective domain sinkholes, in response to determining that the change of the metrics of the respective domain sinkholes does not exceed the first predetermined threshold;
determine, by the computer system, whether change of the feature vectors exceeds a second predetermined threshold; and
re-cluster, by the computer system, the malware domains, in response to determining that the change of the feature vectors exceeds the second predetermined threshold.

11. A computer system for creating malware domain sinkholes by domain clustering, the computer system comprising:
one or more processors, one or more computer readable tangible storage devices, and program instructions stored on at least one of the one or more computer readable tangible storage devices for execution by at least one of the one or more processors, the program instructions executable to:
generate, by a computer system, domain clusters based on malware domain families, using a convolutional neural network model;
obtain, by the computer system, from output of the convolutional neural network model, the malware domain families;
determine, by the computer system, whether a number of the malware domains families is greater than a number of malware domain labels in training datasets;
re-train, by the computer system, the convolutional neural network model, in response to determining that the number of the malware domains families is greater than the number of malware domain labels in training datasets;
cluster, by the computer system, malware domains into the domain clusters;
collect, by the computer system, domain metrics in the domain clusters;
sort, by the computer system, clustered malware domains in respective ones of the domain clusters, based on the domain metrics; and
select, by the computer system, from the clustered malware domains in the respective ones of the domain clusters, a predetermined number of top domains as candidates of respective domain sinkholes, the respective domain sinkholes being created for the respective ones of the domain clusters.

12. The computer system of claim 11, further comprising the program instructions executable to:
generate, by the computer system, the domain clusters based on domain activities.

13. The computer system of claim 12, further comprising the program instructions executable to:
- measure, by the computer system, quality of the domain clusters;
- determine, by the computer system, whether the quality of the domain clusters decreases to a predetermined threshold; and
- re-cluster, by the computer system, the malware domains with newly added malware domains, in response to determining that the quality of the domain clusters decreases to the predetermined threshold.

14. The computer system of claim 11, further comprising the program instructions executable to:
- collect, by the computer system, metrics of the respective domain sinkholes;
- determine, by the computer system, whether change of the metrics of the respective domain sinkholes exceeds a first predetermined threshold; and
- re-select, by the computer system, the candidates of the respective domain sinkhole, in response to determining that the change of the metrics of the respective domain sinkholes exceeds the first predetermined threshold.

15. The computer system of claim 14, further comprising the program instructions executable to:
- construct, by the computer system, feature vectors for the respective domain sinkholes, based on the metrics of the respective domain sinkholes, in response to determining that the change of the metrics of the respective domain sinkholes does not exceed the first predetermined threshold;
- determine, by the computer system, whether change of the feature vectors exceeds a second predetermined threshold; and
- re-cluster, by the computer system, the malware domains, in response to determining that the change of the feature vectors exceeds the second predetermined threshold.

* * * * *